Figure 1:
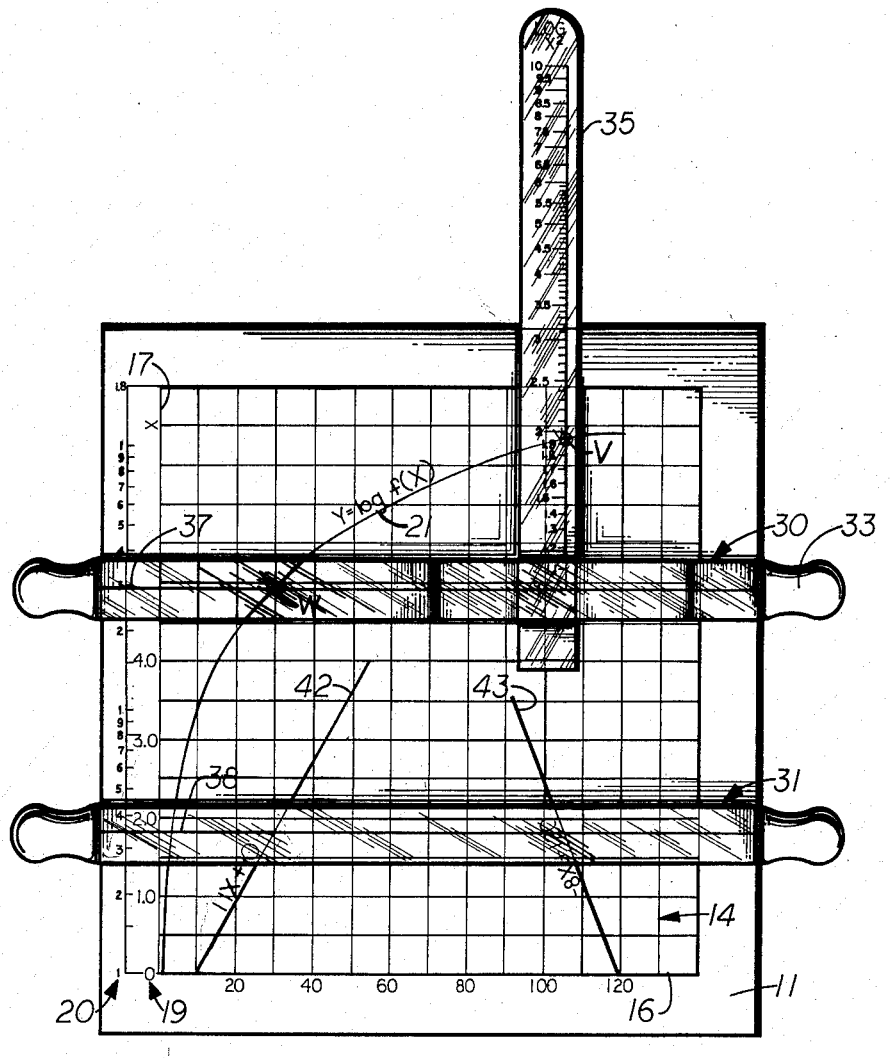

April 28, 1964     KUANG HAO HSIAO     3,130,905

SLIDE RULE FOR SOLVING EQUATIONS

Filed May 27, 1963     2 Sheets-Sheet 1

INVENTOR.
KUANG HAO HSIAO
BY
ATTORNEY

April 28, 1964     KUANG HAO HSIAO     3,130,905
SLIDE RULE FOR SOLVING EQUATIONS
Filed May 27, 1963     2 Sheets-Sheet 2

INVENTOR.
KUANG HAO HSIAO
ATTORNEY 3,130,905
SLIDE RULE FOR SOLVING EQUATIONS
Kuang Hao Hsiao, 20617 Amie St., Torrance, Calif.
Filed May 27, 1963, Ser. No. 283,172
10 Claims. (Cl. 235—89)

This invention relates to slide rules for solving equations and more particularly to such devices which are suitable for solving cubic and higher degree algebraic equations.

It is often necessary to solve for the roots of a cubic or higher degree equations, for example, in making a mechanical vibration analysis or in determining the components of an electrical signal. While quadratic equations can readily be solved by means of the well known formula therefor, cubic and higher degree equations can only be solved by considerable computations, utilizing for the most part trial and error techniques.

The device of this invention enables the determination of a real root of cubic or higher degree equations in a relatively short period of time and with relatively little effort as compared with prior art techniques. Such roots can be obtained to an accuracy high enough for most practical purposes.

In the device of the invention, a base plate is utilized having horizontal and vertical axes drawn thereon. Linear scales are drawn along each of said axes, one of these scales representing "X" and the other scale representing functions of "X." In a first embodiment, a curve is drawn between the two axes to represent the log of the functions of "X." In a second embodiment, such a curve representing the log of functions of "X" is drawn on one of the slide means to be described below.

Slide means may comprise a pair of transparent sliders, each having a hair line or a curve as indicated above, scribed thereon are mounted along the sides of the base plate for sliding movement along one of the axes. Mounted on one of these sliders for sliding motion is a third slider having a scale indicating values of "X" each of which appears at a point corresponding to the logarithmic length of the indicated value of "X" to a predetermined integral power greater than one. Additional sliders similar to the third slider and representing values of "X" corresponding to logarithmic lengths for other functions of "X" may be used for solving equations higher than third degree. The linear factors of the particular equation to be solved which can readily be extracted therefrom, are plotted on the base plate. By manipulation of the sliders, as to be illustrated further on in the specification in connection with the various illustrations, a real root of the particular equation in question can readily be determined.

It is therefore an object of this invention to facilitate the solution of cubic and higher degree equations.

It is a further object of this invention to provide a unique slide rule device for facilitating the solution of algebraic equations.

It is another object of this invention to provide a slide rule device which greatly cuts down the time required for the solution of cubic and higher degree equations.

Figure 2:
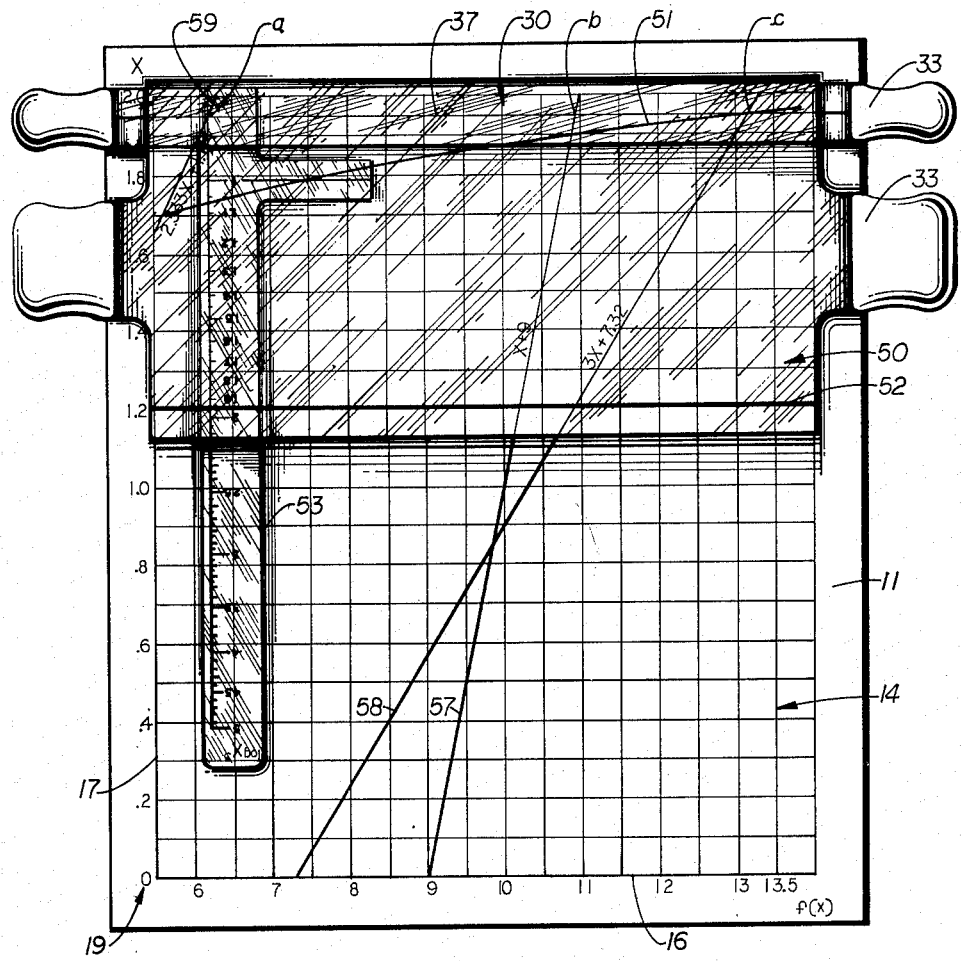

Other objects of this invention will become apparent from the following description taken in connection with the accompanying drawings of which FIG. 1 is an illustration of a first embodiment of the device of the invention for solving cubic equations, and FIG. 2 is an illustration of the second embodiment of the device of the invention for solving quartic equations.

Referring to FIG. 1, a first embodiment of the device of the invention is illustrated. Base plate 11 which may be fabricated of plastic or other suitable material, has a series of lines 14 permanently scribed thereon to form a checkerboard pattern. Along the edge 16 of the checkerboard pattern which represents one axis, a linear scale representing functions of "X" is permanently scribed on base plate 11. On the edge 17 of the checkerboard pattern which represents the other axis, a linear scale 19 and a log scale 20 are permanently scribed. Permanently scribed on the checkerboard pattern is a line 21 representing "Y" which is equal to the log of functions of "X." This line represents the plot of values on the linear scale along edge 16 against the log scale 20. Thus, for example, the projection of "20" on the scale along edge 16 intersects the "Y" curve (line 21) opposite "2" on the 2nd decade of the log scale 20 which reprents "20" on this scale.

Mounted for sliding motion on base plate 11 along edge line 17 are two sliders 30 and 31. These sliders may be attached to base plate 11 for sliding motion along the edges thereof by any suitable means such as, for example, spring slips (not shown) which slide in grooves (not shown) along the edges of the base plate. Sliders 30 and 31 have knobs 33 on the ends thereof to enable the desired manipulation thereof.

Slidably mounted on slider 30 is a third slider 35. This slider is mounted for movement relative to slider 30 parallel to the axis established by edge line 16. Permanently scribed on slider 35 is a scale representing the length of the log of $X^2$. Each numeral on this scale designates a value of X which represents a logarithmic length which is the same logarithmic length as that on scale 20 designated by a numeral which is the square thereof. Thus, for example, the length on scale 35 designated as 2 is equal to the length designated on scale 20 as the square of 2 or 4; and the length designated 3 on scale 35 corresponds to the length designated 9 on scale 20, etc.

Each of sliders 30, 31 and 35 is made of transparent material such as for example clear plastic. Sliders 30 and 31 each have hair lines 37 and 38 respectively scribed thereon.

Base-plate 11 is fabricated of a material on which lines can readily be drawn and erased therefrom such as, for example, a roughened non-transparent plastic. This is to enable the drawing-in of lines 42 and 43 which represent linear factors of the particular equation to be solved. These lines are drawn in for each particular equation and once the equation has been solved they are erased to allow for future utilization of the device.

The device of the invention as illustrated in FIG. 1 is utilized as follows. Let us assume that the following cubic equation is to be solved:

$$11X^3 + 10X^2 + 8X - 120 = 0 \qquad (1)$$

As a first step, this equation is separated so that one half the equation is on one side of the equals sign and the other half on the other side as follows:

$$11X^3 + 10X^2 = -8X + 120 \qquad (2)$$

The equation is then transformed as follows:

$$X^2 = \frac{-8X + 120}{11X + 10} \qquad (3)$$

The linear factor $11X + 10$ is now plotted on base plate 11 which is shown in FIG. 1 as line 42. Similarly, the factor $-8X + 120$ is plotted as line 43. These two lines are plotted for values of X as indicated on scale 19 against the functions of X as indicated on the scale along edge 16. This can readily be achieved by merely finding two points for each line.

In solving the equation, slider 31 is first arbitrarily positioned with its hairline 38 intersecting lines 42 and 43 and scale 19. The intersection points are projected onto curve 21, the intersection point for line 42 being indicated in FIG. 1 as "W" and the intersection point for line 43 being shown as "V." The slider 30 is then positioned until its hairline intersects points "W." Slider 35 is then moved until its scale line intersects point "V," the origin of this scale (marked "1") passing through hairline 37. If the reading on the scale of slider 35 where the scale intersects curve 21 is the same as the reading on scale 19 where hairline 38 passes therethrough, this value is a root of the equation. As can be seen slider 31 is positioned experimentally until the identical reading for the particular position assumed is obtained where slider 35 intersects the projection point "V." After one or two tries the direction one must go to obtain the correct solution will readily become apparent and the operator will converge on this solution in short order. It is to be noted that scale 35 is positioned so that its origin indicated as "1" coincides with the position of hair line 37.

The device is shown in FIG. 1 with the sliders almost in position for the solution of the exemplary equation. As can be seen, hair line 38 intersects scale 19 at 1.8 on the scale. Points "W" and "V" are determined as hereinbefore indicated as the projections of the intersections of lines 42 and 43 with hairline 38 respectively onto curve 21. With hair line 37 passing through point "W," the scale line of slider 35 passes through point "V" at 1.92 on this scale. This indicates that the correct solution is somewhere between 1.8 and 1.92. Inspection of FIG. 1 will indicate that when slider 31 is moved until it intersects scale 19 at a point corresponding to 1.86, the scale of slider 35 will intersect point "V" at 1.86, thereby giving the correct real root, $X=1.86$. The embodiment of FIG. 1 can thus be utilized to rapidly solve a cubic equation for a real root.

Referring now to FIG. 2, a second embodiment of the device of the invention is illustrated. This embodiment, as shown in the illustrative example, may be utilized for solving quartic equations. The embodiment of FIG. 2 differs from that of FIG. 1 in that the "Y" curve representing the log of functions of "X" is drawn on one of the sliders rather than on the base plate. Also, in this embodiment, a pair of differential measurements are utilized in arriving at the solution.

Base plate 11 has a linear scale 19 plotted along edge line 17 and a scale representing functions of "X" plotted along edge line 16, similar to the base plate described in connection with FIG. 1. A first slider 30 having a hairline 37 thereon is mounted on the base plate for sliding motion along the axis defined by edge line 17. Mounted for sliding motion on slider 30, is slider 53. Slider 53 is mounted for motion both along hairline 37 and normal thereto. Slider 53 has a scale scribed thereon to represent the logarithmic lengths of values of "$X^3$." The numerals on this scale indicate values of "X" representing lengths corresponding to the log of "$X^3$" similarly to the way scale 35 in the embodiment of FIG. 1 represents values of the log of "$X^2$." These represented lengths are directly related to "Y" curve 51 which is drawn on slider 50. Thus, for example, the length from the origin to "2" on the scale of slider 53 is equal to the length between the sliding abscissa hairline 52 and sliding curve 51 as measured vertically opposite "8" on the $f(X)$ scale (along edge line 16).

Slider 50 is mounted for sliding motion on base plate 11 along the axis defined by edge line 17. Slider 50 has a hairline 52 defining the abscissa of "Y" curve 51 which is scribed thereon. "Y" curve 51 represents the plot of functions of "X" (scribed along edge line 16) against a log scale which is in conformity with the represented values of log "$X^3$" shown on the scale of slider 53. Thus, for example, the length indicated by "2" on the scale of slider 53 is equivalent to the length indicated by log "$X^3$" or log 8 on the log scale against which "Y" curve 51 has been plotted. "Y" curve 51 is thus plotted similarly to the "Y" curve of FIG. 1.

Lines 57, 58, and 59 each represent a linear factor of the particular equation to be solved and are erasably scribed on base plate 11 in making such a solution.

Let us now illustrate how a typical quartic equation is solved with the device of the invention shown in FIG. 2. The illustrative equation is as follows:

$$X^4+9X^3-7X^2-22X-12=0 \quad (4)$$

This equation is first separated so that one half thereof is on one side of the equals sign, and the other half is on the other side as follows:

$$X^4+9X^3=7X^2+22X+12 \quad (5)$$

This equation is then transformed as follows:

$$\frac{X^3}{2.333X+1.64}=\frac{3X+7.32}{X+9} \quad (6)$$

The linear factors of the equation, $2.333X+1.64$, $X+9$, and $3X+7.32$ are plotted on base plate 11 as lines 59, 57, and 58 respectively. Each of these linear factors can readily be plotted by merely finding points for two values of "X" on scale 19 as plotted against the functions of "X" set forth along line 16.

The equation is now solved as follows:

Slider 30 is first arbitrarily positioned so that its hairline 37 intersects lines 59, 57, and 58. These intersection points are designated in FIG. 2 as "a," "b," and "c" respectively. Slider 53 is then positioned until curve 51 intersects point "c." Slider 53 is then positioned so that its scale line passes through point "a" and line 52 passes through a point on its scale corresponding in its reading to the scale reading of scale 19 where hairline 37 runs therethrough. If the distance represented by the vertical projection from point "b" and "Y" curve 51 is equal to the vertical distance between the origin of the scale scribed on slider 53 and "Y" curve 51 as measured along the scale line, then a real root of the equation is the value for "X" indicated by both the intersection point of hairline 37 and scale 19 and the intersection point of line 52 and the scale on slider 53. After a few experimental tries with the sliders, the direction one must go to find the root will become apparent, and the operator will rapidly converge on the right answer.

The sliders as shown in FIG. 2 are positioned in the correct position for the solution of the equation which shows that a real root of the equation is "1.95." As can be seen, the vertical projection from point "b" to line 51 is equal in length to the distance between the origin of the scale on slider 53 and "Y" curve 51.

The same basic structure and techniques as illustrated in FIG. 2 and described in connection therewith can be utilized in solving fifth and higher order equations with but slight modification to the device.

The device of the invention thus provides relatively simple yet highly effective means for solving algebraic equations in a relatively short period of time as compared with prior art techniques.

While the invention has been described and illustrated in detail, it is to be clearly understood that this is intended by way of illustration and example only and is not to be taken by way of limitation, the spirit and scope of this invention being limited only by the terms of the following claims.

I claim:
1. A slide rule for solving algebraic equations comprising
    base plate means having horizontal and vertical axes represented thereon, a linear scale being drawn along each of said axes to represent "X" and functions of "X" respectively,
    first and second transparent horizontal slider means slidably mounted on said base plate means for movement parallel to said vertical axis,
    one of said aforementioned means having a curve drawn thereon to represent the log of said functions of "X,"
    a third transparent slider means slidably mounted on said first slider means for movement parallel to said horizontal axis, said third slider means having a scale thereon representing the log of an integral power of "X" greater than 1, whereby in achieving a solution to an equation, lines are drawn on said base plate means between the axes to represent linear factors of the equation, one of the horizontal slider means is positioned to intersect the lines so drawn, the other of the horizontal slider means is positioned to relate the curve to the intersections obtained with said one of the horizontal slider means, and the third slider means is positioned to obtain a reading on its scale corresponding to the reading obtained between said one of the horizontal slider means and the linear scale representing "X."

2. The rule as recited in claim 1 wherein said curve representing the log of said functions of "X" is drawn on said base plate means, a log scale being drawn along the axis on which said scale representing "X" is drawn.

3. The rule as recited in claim 1 wherein said curve representing the log of said functions of "X" is drawn on said second slider means, said first slider means having a hair line drawn thereon.

4. A slide rule for solving algebraic equations comprising a base plate having horizontal and vertical axes represented thereon, log and linear scales being drawn along one of said axes, a linear scale being drawn along the other of said axes to represent functions of "X," a curve drawn between said axes to represent the plot of said functions of "X" against said log scale, first and second transparent slider means having indicator lines thereon slidably mounted on said back plate for movement parallel to said one of said axes, a third transparent slider means slidably mounted on said first slider means for movement parallel to the other of said axes, said third slider means having a scale thereon representing the log of an integral power of "X" greater than 1, whereby an equation is solved by drawing lines on said base plate base between the axes to represent linear factors of said equation, positioning the indicator line of said second slider means to intersect said linear factor lines, the intersections with said linear factor lines providing projections onto said curve representing the plot of said functions of "X," positioning the indicator line of said first slider means to intersect one of said projections, and positioning said third slider means to intersect the other of said projections, such positioning being experimentally varied until coincidence is achieved between the reading at the intersection of the indicator line of said second slider means and said linear scale drawn along said one of said axes and the reading at the intersection between the scale of said third slider means and said curve representing the plot of said functions of "X."

5. The device as recited in claim 4 wherein said third slider scale represents the log of $X^2$.

6. A slide rule for solving algebraic equations comprising a base plate having horizontal and vertical axes represented thereon, a linear scale being drawn along each of said axes to represent "X" and functions of "X" respectively, first and second transparent slider means slidably mounted on said base plate for movement parallel to one of said axes, said second slider means having a curve drawn thereon to represent the log of said functions of "X," said second slider means having a hair line scribed thereon, a third transparent slider means slidably mounted on said first slider means for movement along both said axes, said third slider means having a scale thereon representing the log of an integral power of "X" greater than 1, whereby in achieving a solution to an equation, lines are drawn on said base plate means between the axes to represent linear factors of the equation, one of the slider means is positioned to intersect the lines so drawn, another of the slider means is positioned to relate the curve to the intersections obtained with said one of the slider means, and the third slider means is positioned to obtain a reading on its scale corresponding to the reading obtained between said one of the slider means and the linear scale representing "X."

7. The rule as recited in claim 6 wherein the scale on said third slider means has a scale thereon representing log $X^3$.

8. In a slide rule for solving algebraic equations, base plate means having vertical and horizontal axes scribed thereon, one of said axes having a linear scale representing values of "X" scribed therealong, the other of said axes having a linear scale representing functions of "X" scribed therealong, first and second slider means mounted on said base plate means for slidable motion along said one of said axes, and third slider means for representing lengths corresponding to the log of a predetermined function of "X," said third slider maens being mounted on said first slider means for slidable motion normal to said one of said axes, one of said aforementioned means having a curve scribed thereon corresponding to the log of said functions of "X" scribed along the other of said axes, whereby in achieving a solution to an equation, lines are drawn on said base plate means between the axes to represent linear factors of the equation, one of the slider means is positioned to intersect the lines so drawn, another of the slider means is positioned to relate the curve to the intersections obtained with said one of the slider means, and the third slider means is positioned to obtain a reading on its scale corresponding to the reading obtained between said one of the slider means and the linear scale representing "X."

9. The rule as recited in claim 8 wherein said curve corresponding to the log of said functions of "X" is scribed on said base plate and said second slider means has a hair line scribed thereon.

10. The rule as recited in claim 8 wherein said curve corresponding to the log of said functions of "X" is scribed on said second slider means.

References Cited in the file of this patent
UNITED STATES PATENTS

| | | |
|---|---|---|
| 2,288,697 | Glazer | July 7, 1942 |
| 2,520,904 | Boehm | Sept. 5, 1950 |